US012624813B2

(12) United States Patent
Kaneko et al.

(10) Patent No.: US 12,624,813 B2
(45) Date of Patent: May 12, 2026

(54) VEHICLE LAMP

(71) Applicant: STANLEY ELECTRIC CO., LTD., Tokyo (JP)

(72) Inventors: Nao Kaneko, Tokyo (JP); Shinya Kogure, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/225,300

(22) Filed: Jun. 2, 2025

(65) Prior Publication Data

US 2025/0369582 A1 Dec. 4, 2025

(30) Foreign Application Priority Data

Jun. 4, 2024 (JP) ................................ 2024-090670

(51) Int. Cl.

| | |
|---|---|
| ***F21S 41/36*** | (2018.01) |
| ***F21S 41/147*** | (2018.01) |
| ***F21S 41/16*** | (2018.01) |
| ***F21S 41/24*** | (2018.01) |
| ***F21S 41/255*** | (2018.01) |
| ***F21S 41/663*** | (2018.01) |
| ***F21W 102/155*** | (2018.01) |
| ***F21Y 115/10*** | (2016.01) |
| ***F21Y 115/30*** | (2016.01) |

(52) U.S. Cl.

CPC ............ *F21S 41/36* (2018.01); *F21S 41/147* (2018.01); *F21S 41/16* (2018.01); *F21S 41/24* (2018.01); *F21S 41/255* (2018.01); *F21S 41/663* (2018.01); *F21W 2102/155* (2018.01); *F21Y 2115/10* (2016.08); *F21Y 2115/30* (2016.08)

(58) Field of Classification Search

CPC .......... F21S 41/36; F21S 41/24; F21S 41/663; F21S 41/147; F21S 41/16; F21S 41/255

See application file for complete search history.

(56) References Cited

U.S. PATENT DOCUMENTS

| | | | | |
|---|---|---|---|---|
| 9,074,746 | B2 * | 7/2015 | Rice | F21S 43/14 |
| 11,815,240 | B1 * | 11/2023 | Shih | F21S 41/26 |
| 12,422,122 | B2 * | 9/2025 | Ruan | H05B 3/84 |

(Continued)

FOREIGN PATENT DOCUMENTS

| | | |
|---|---|---|
| JP | 2019-220404 A | 12/2019 |
| JP | 2022-028514 A | 2/2022 |

*Primary Examiner* — Bryon T Gyllstrom
(74) *Attorney, Agent, or Firm* — Kenealy Vaidya LLP

(57) ABSTRACT

A vehicle lamp includes a light source that radially emits light beam diagonally upward toward front, a projection lens that projects light beam emitted from the light source toward a front of a vehicle, and a reflection optical system that reflects the light beam emitted from the light source toward the projection lens, wherein the reflection optical system has a first reflection surface and a second reflection surface that are located diagonally above and in front of the light source, the first reflection surface forms a surface that is curved in an outward convex shape in the vertical cross section to reflect the light beam toward the projection lens while condensing the light beam, and the second reflection surface forms a surface that is curved in an inward concave shape in the vertical cross section to reflect the light beam toward the projection lens while diffusing the light beam.

10 Claims, 11 Drawing Sheets

(56) References Cited

U.S. PATENT DOCUMENTS

| | | | | |
|---|---|---|---|---|
| 2022/0003375 | A1* | 1/2022 | Sugiyama | F21S 41/663 |
| 2022/0034472 | A1* | 2/2022 | Iwasaki | F21S 41/147 |
| 2024/0019094 | A1* | 1/2024 | Muramatsu | F21S 41/28 |
| 2025/0010786 | A1* | 1/2025 | Muramatsu | B60Q 1/12 |
| 2025/0012422 | A1* | 1/2025 | Muramatsu | F21S 41/24 |
| 2025/0052387 | A1* | 2/2025 | Imamura | F21S 41/36 |
| 2025/0207748 | A1* | 6/2025 | Lim | F21S 43/26241 |
| 2025/0230912 | A1* | 7/2025 | Sun | F21S 41/147 |

* cited by examiner

VEHICLE LAMP

CROSS-REFERENCE TO RELATED APPLICATION

Priority is claimed on Japanese Patent Application No. 2024-090670, filed Jun. 4, 2024, the content of which is incorporated herein by reference.

BACKGROUND OF THE INVENTION

Field of the Invention

The present invention relates to a vehicle lamp.

Description of Related Art

For example, vehicle lamps such as vehicle headlights (headlamps) emit light, which forms a low-beam light distribution pattern including a cutoff line at an upper end as a dipped beam (a low beam), toward the front of the vehicle. Alternatively, vehicle lamps such as vehicle headlights (headlamps) emit, as a driving beam (a high beam), light that forms a high-beam light distribution pattern above the low-beam light distribution pattern, toward the front of the vehicle.

Meanwhile, in the field of vehicle lamps, development of an adaptive light distribution headlamp (ADB) that includes a plurality of light sources arranged in a vehicle width direction and a projection lens that projects light emitted from the plurality of light sources toward the front of the vehicle, and that variably controls a light distribution pattern of the light projected by the projection lens while lighting of the plurality of light sources is switched is underway (refer to, for example, Japanese Unexamined Patent Application, First Publication No. 2019-220404). The ADB is a technology that uses an onboard camera to recognize preceding vehicles, oncoming vehicles, pedestrians, and the like, and expands a driver's forward visibility at night without dazzling drivers or pedestrians in front.

In addition, some vehicle lamps integrate a low-beam optical system and a high-beam optical system, and each of the light sources is installed on the same plane so that an emission axis of each light faces diagonally upward toward the front (for example, Japanese Patent Application Publication No. 2022-28514).

SUMMARY OF THE INVENTION

However, in the above-described conventional vehicle lamp, when light emitted from the light source diagonally upward toward the front is reflected by a reflection surface toward the projection lens located in the front, there is a problem that efficiency of capturing light passing near a focal point of the projection lens becomes poor, and a maximum luminous intensity of the high-beam light distribution pattern becomes insufficient.

On the other hand, by reducing dimensions of a emission surface of a light guide lens in an up-down direction, a density of the light passing near the focal point of the projection lens increases, and the luminous intensity is improved, but the spread of the light projected by the projection lens in the up-down direction becomes insufficient.

An aspect of the present invention provides a vehicle lamp capable of improving light utilization efficiency and obtaining a good light distribution pattern.

An aspect of the present invention provides the following configuration.

[1] A vehicle lamp includes a light source configured to radially emit a light beam diagonally upward toward the front, a projection lens that is disposed in front of the light source and that is configured to project light beam emitted from the light source toward a front of a vehicle, and a reflection optical system that is disposed between the light source and the projection lens and that is configured to reflect the light beam emitted from the light source toward the projection lens, wherein the reflection optical system has a first reflection surface and a second reflection surface that are located diagonally above and in front of the light source, in a vertical cross section including an optical axis of the light beam emitted from the light source, the second reflection surface and the first reflection surface are arranged in this order toward the front of the light source, so that, among the light beam radially emitted from the light source, a light beam in a central region including the optical axis enters the first reflection surface, and a light beam in an upper peripheral region above the central region enters the second reflection surface, the first reflection surface forms a surface that is curved in an outward convex shape in the vertical cross section to reflect the light beam in the central region toward the projection lens while condensing the light beam, and the second reflection surface forms a surface that is curved in an inward concave shape in the vertical cross section to reflect the light beam in the upper peripheral region toward the projection lens while diffusing the light beam.

[2] In the vehicle lamp described in [1], a light distribution pattern obtained by superimposing a first light distribution pattern formed by the light beam in the central region and a second light distribution pattern formed by the light beam in the upper peripheral region may be projected forward while being inverted upside down by the projection lens.

[3] In the vehicle lamp described in [2], the second light distribution pattern may have a larger irradiation range in an up-down direction than the first light distribution pattern, and the first light distribution pattern may have a higher maximum luminous intensity than the second light distribution pattern.

[4] In the vehicle lamp described in [1], the first reflection surface and the second reflection surface may form a continuous surface.

[5] In the vehicle lamp described in [1], the reflection optical system may be constituted by a part of a light guide lens, the light guide lens may have an incident surface that is located on a side facing the light source, the first reflection surface and the second reflection surface that are located diagonally upward in front of the light source, and an emission surface that is located on a side facing the projection lens, the light incident surface may allow the light beam emitted from the light source to enter an inside of the light guiding lens, and the light emission surface may emit the light beam guided inside the light guide lens to an outside of the light guide lens toward the projection lens.

[6] In the vehicle lamp described in [5], the incident surface may form a surface that is inclined diagonally downward toward the front in the vertical cross section, and among the light beam radially emitted from the light source, the incident surface enters a light beam in a lower peripheral region below the central region into the inside of the light guide lens toward the emission surface.

[7] In the vehicle lamp described in [6], a light distribution pattern in which a first light distribution pattern formed by the light beam in the central region, a second light distribution pattern formed by the light beam in the upper peripheral region, and a third light distribution pattern formed by the light beam in the lower peripheral region are superimposed may be projected forward while being inverted upside down by the projection lens.

[8] In the vehicle lamp described in [7], an irradiation range in an up-down direction may be larger in order of the second light distribution pattern, the third light distribution pattern, and the first light distribution pattern, and a maximum luminous intensity may be larger in order of the first light distribution pattern, the second light distribution pattern, and the third light distribution pattern.

[9] In the vehicle lamp described in [1], a plurality of light sources may be arranged in a width direction of the vehicle, the reflection optical system may be disposed corresponding to each of the light sources, and the light distribution pattern of the light beam projected by the projection lens may be variably controlled while lighting of the plurality of light sources are switched.

[10] In the vehicle lamp described in [5], a plurality of light sources may be arranged in a width direction of the vehicle, the light guide lens has the incident surface, the first reflection surface, the second reflection surface, and the emission surface which may be disposed corresponding to each of the light sources, the emission surface may be provided continuously in a width direction of the light guide lens, and the light distribution pattern of the light beam projected by the projection lens may be variably controlled while lighting of the plurality of light sources are switched.

According to an aspect of the present invention, a vehicle lamp capable of improving light utilization efficiency and obtaining a good light distribution pattern is provided.

DETAILED DESCRIPTION OF THE INVENTION

Figure 1:
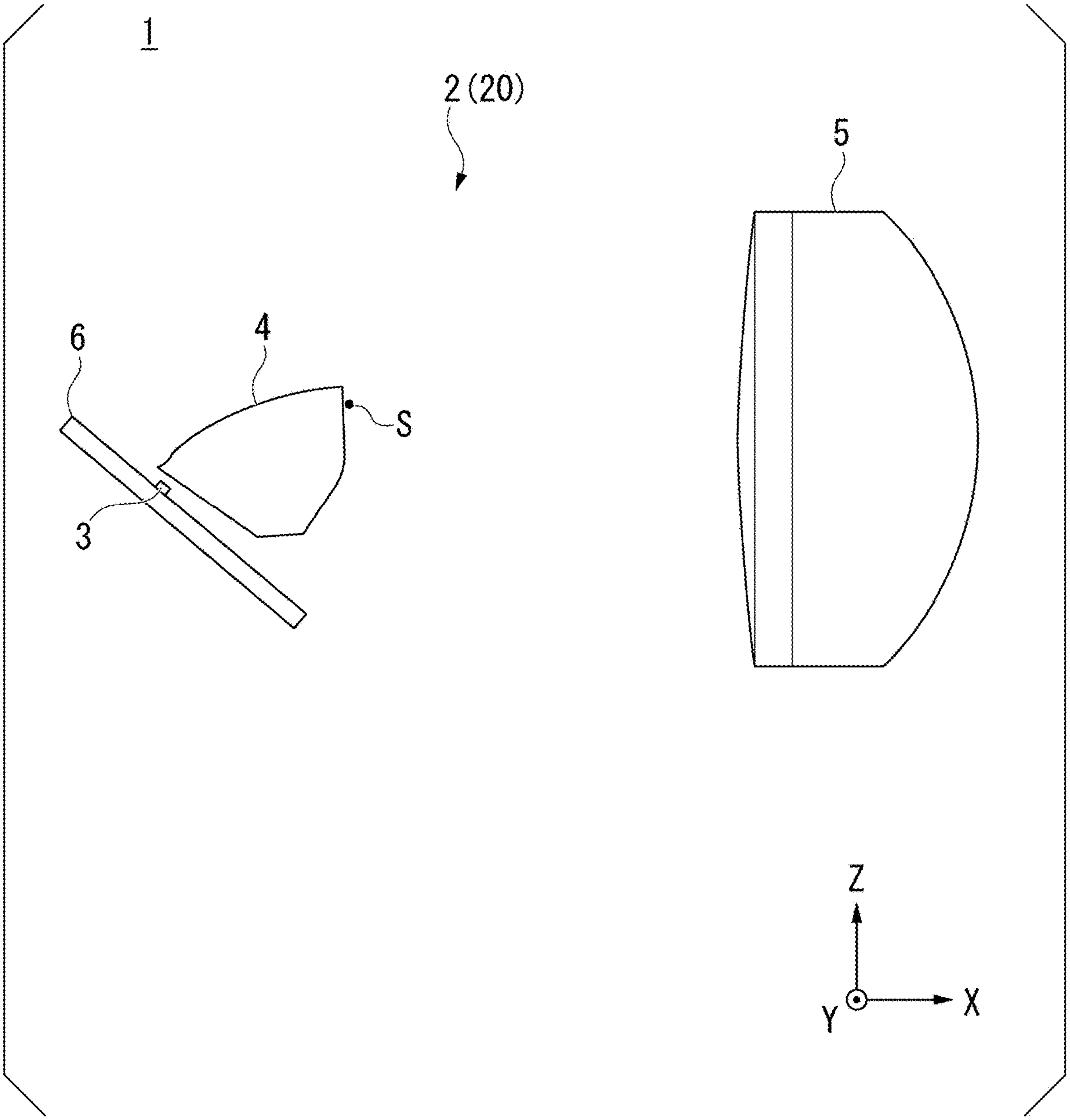
FIG. 1 is a side view showing a configuration of a vehicle lamp according to an embodiment of the present invention.

Hereinafter, an embodiment of the present invention will be described in detail with reference to the drawings.

In the drawings used in the following description, in order to make each component easier to see, dimensions of the components may be shown on different scales, and dimensional ratios of each of the components may not necessarily be the same as in reality.

As an embodiment of the present invention, for example, a configuration of a vehicle lamp 1 shown in FIGS. 1 to 12 will be described.

Figure 2:
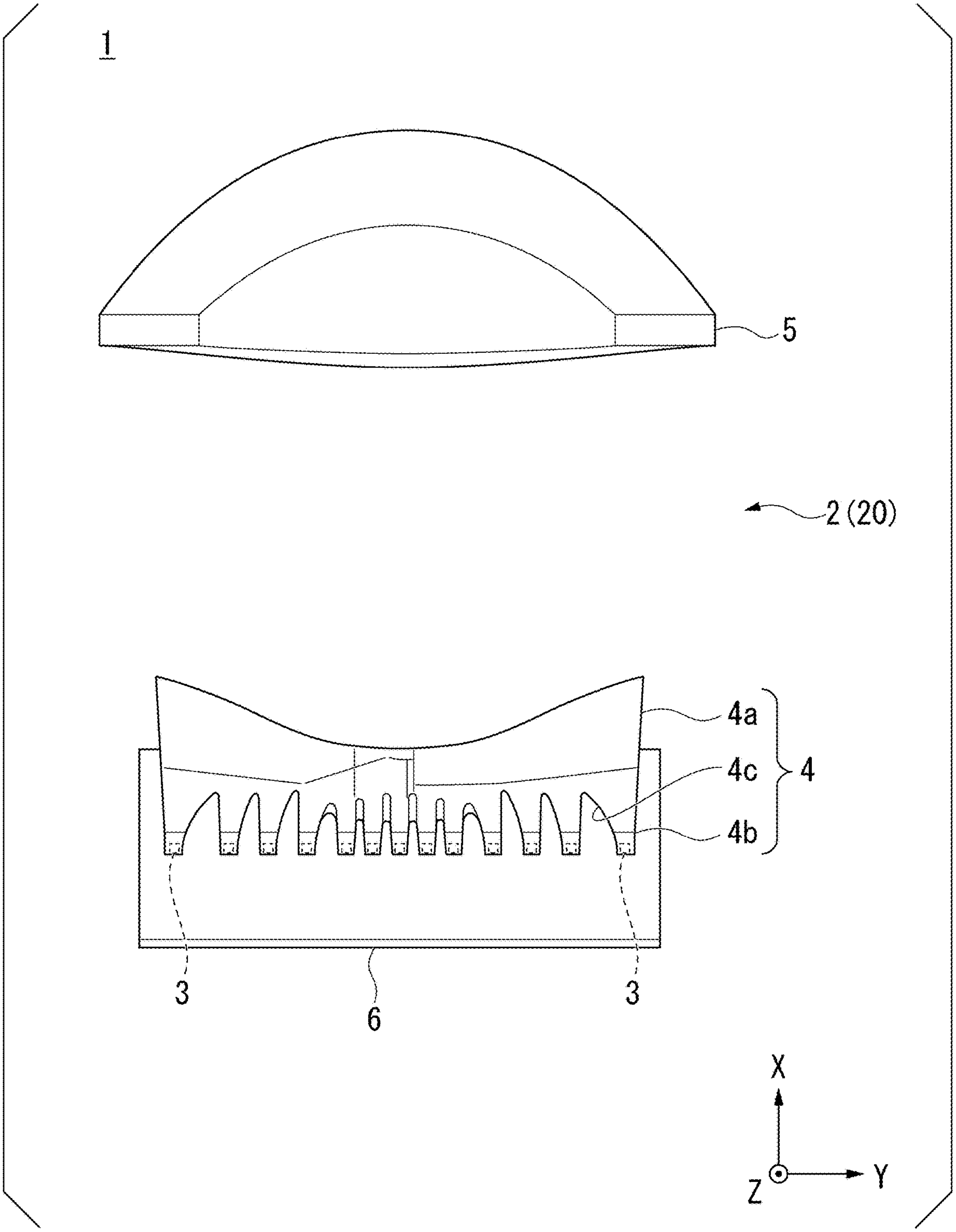
FIG. 2 is a top view of a light source, a light guide lens, and a projection lens included in the vehicle lamp shown in FIG. 1.
Figure 3:
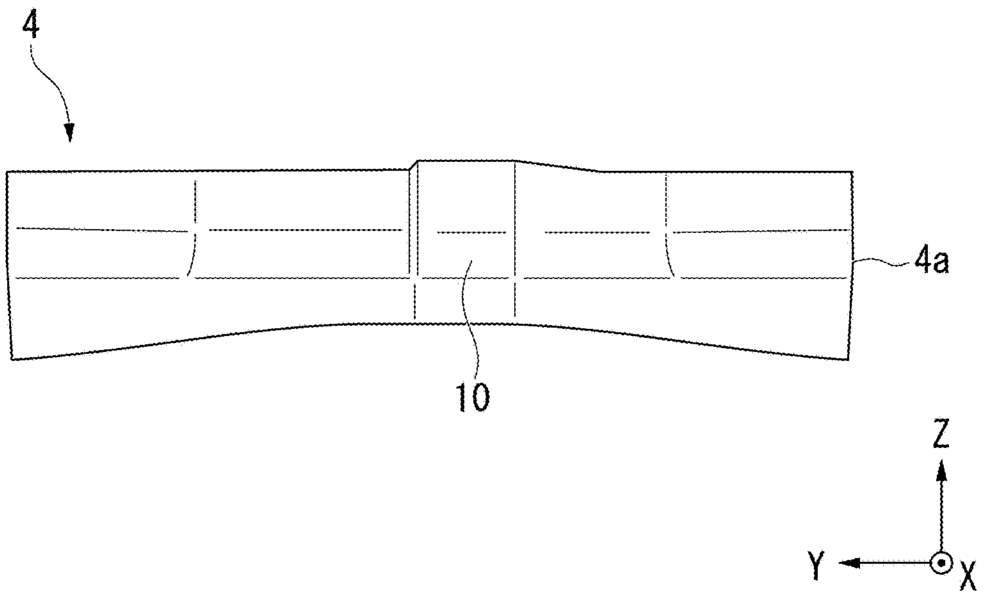
FIG. 3 is a front view of the light guide lens shown in FIG. 1.
Figure 4:
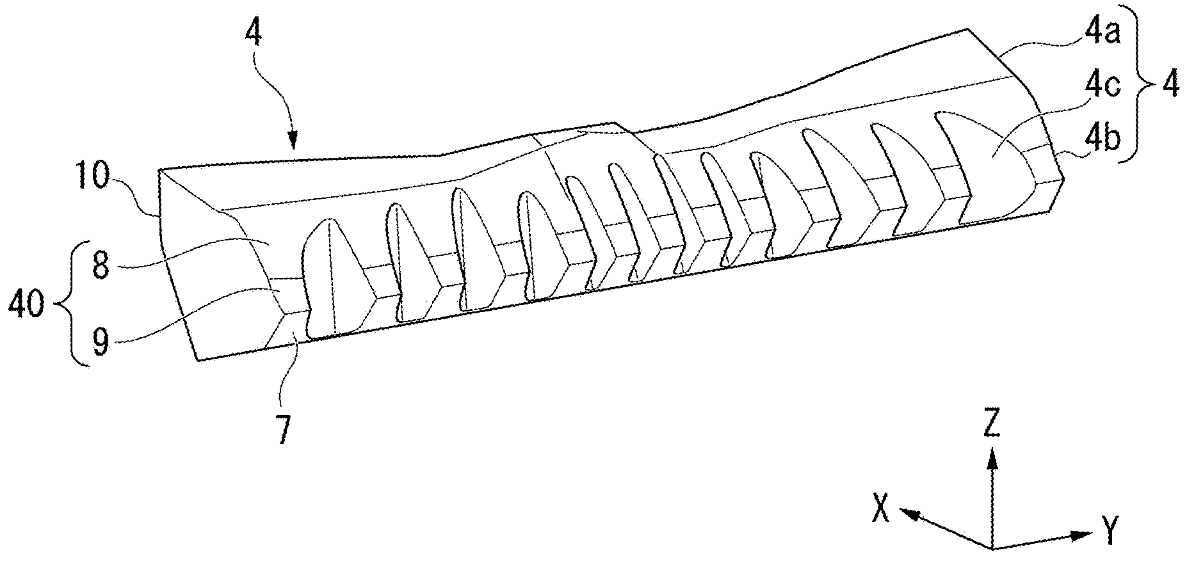
FIG. 4 is a rear perspective view of the light guide lens shown in FIG. 1.
Figure 5:
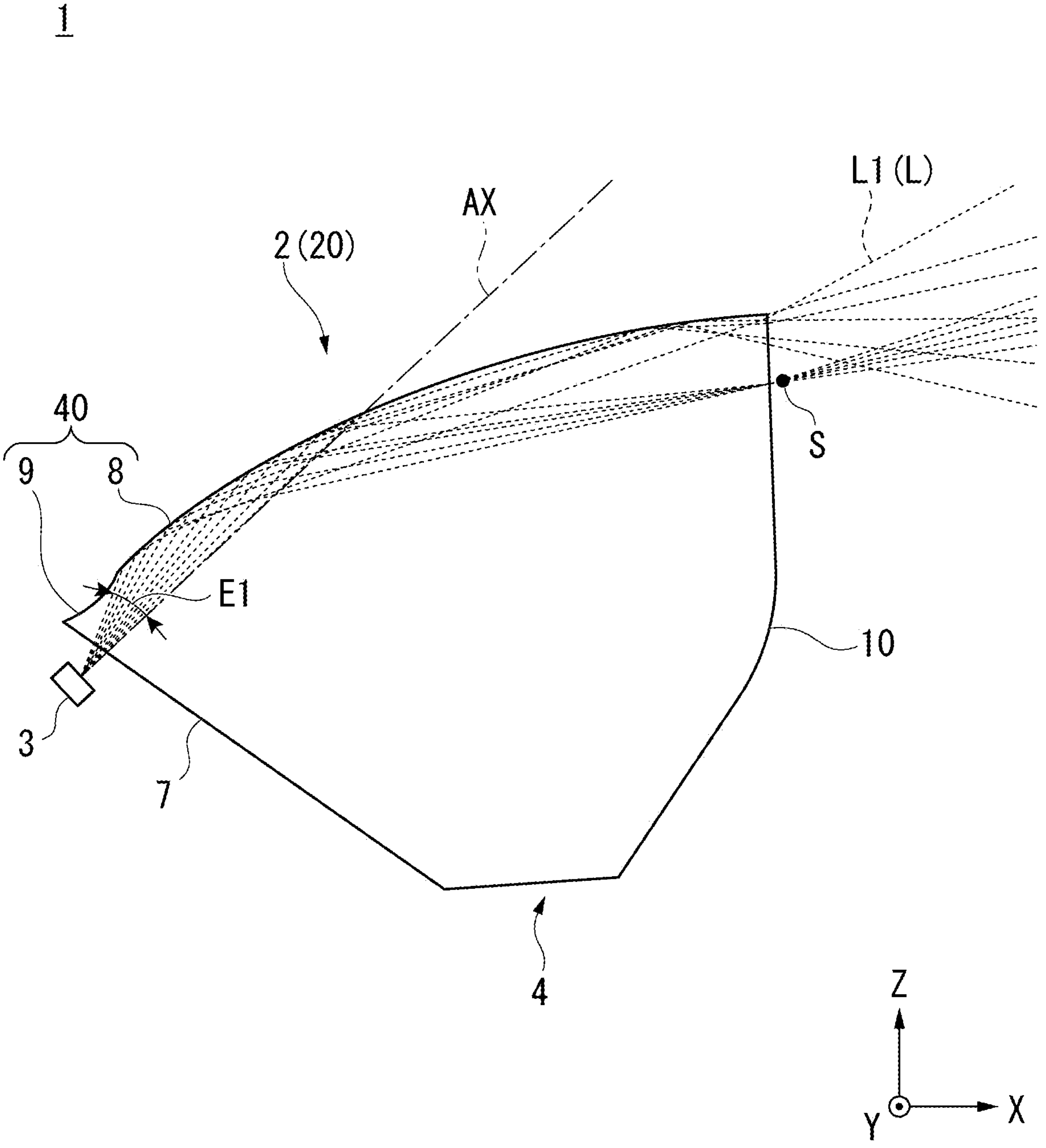
FIG. 5 is a cross-sectional view showing an optical path of a first light beam, among light beams radially emitted from a light source, in the light guide lens shown in FIG. 1.
Figure 6:
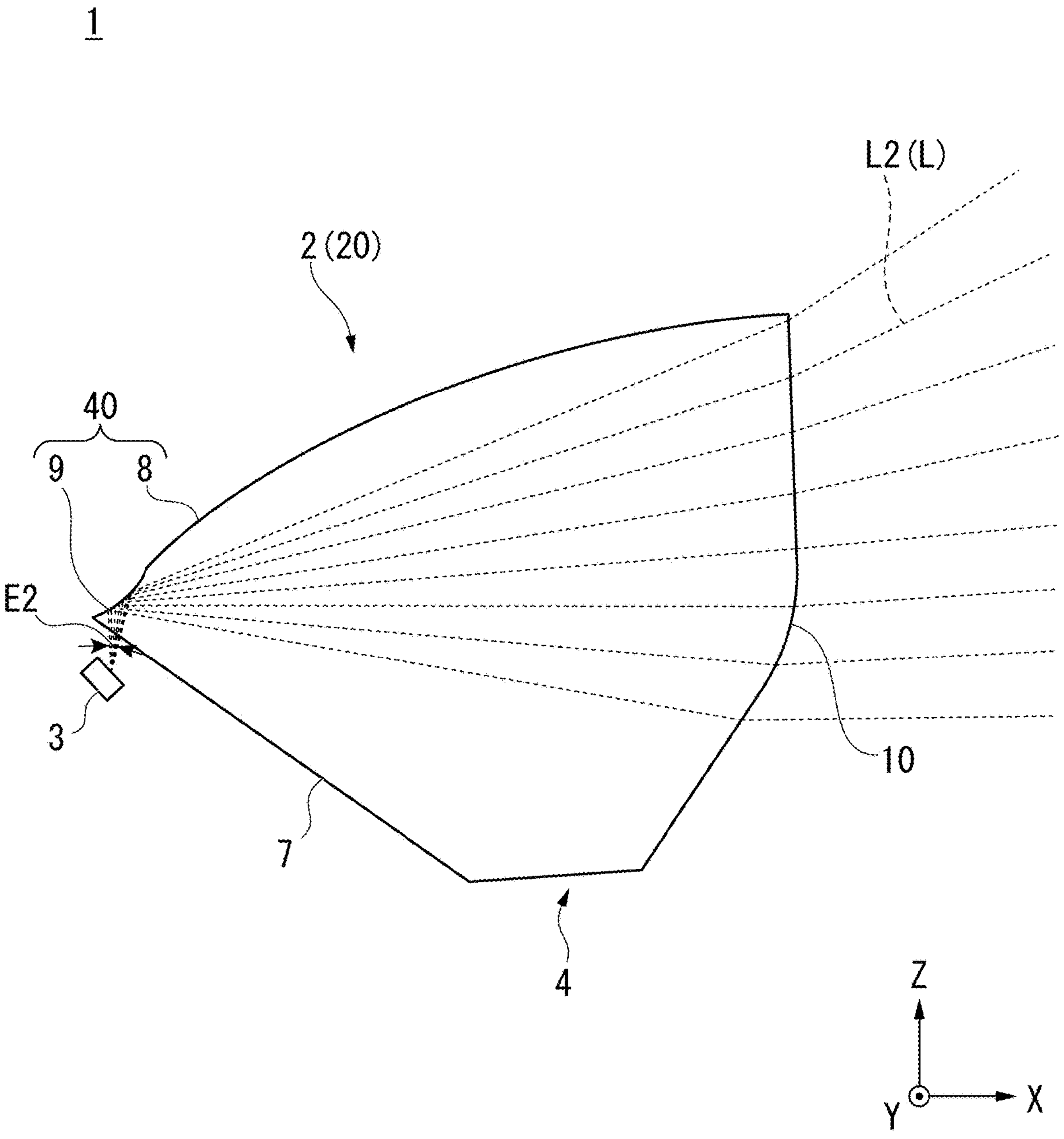
FIG. 6 is a cross-sectional view showing an optical path of a second light beam, among the light beams radially emitted from the light source, in the light guide lens shown in FIG. 1.
Figure 7:
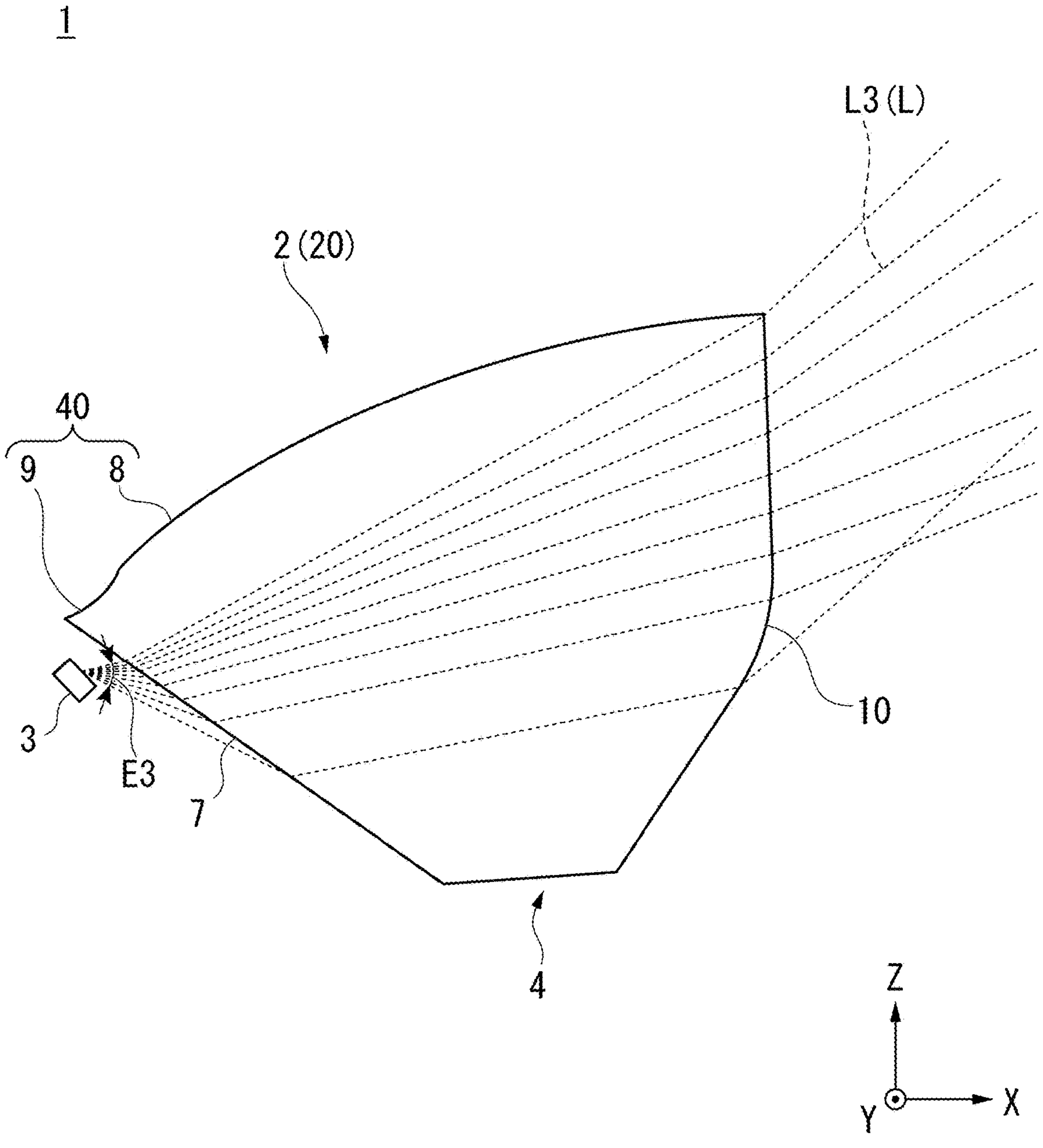
FIG. 7 is a cross-sectional view showing an optical path of a third light beam, among the light beams radially emitted from the light source, in the light guide lens shown in FIG. 1.
Figure 8:
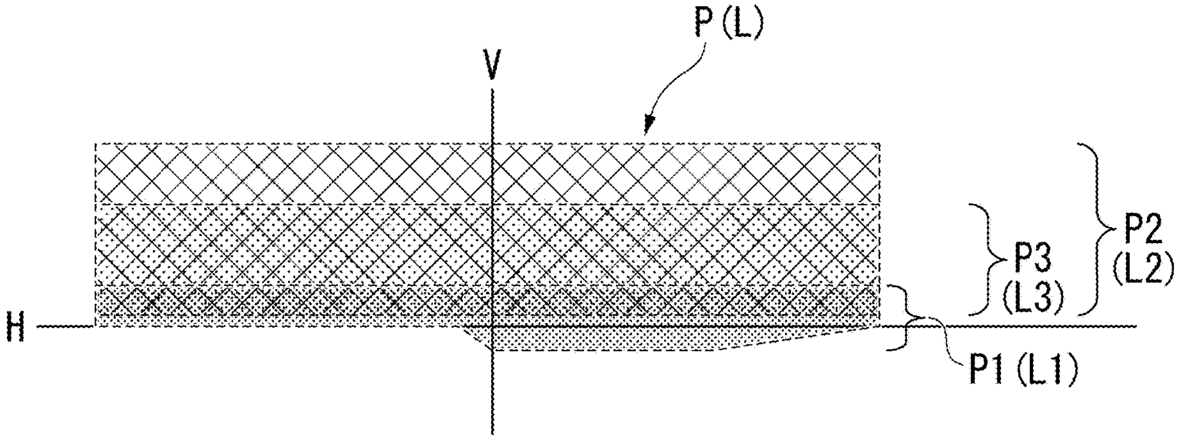
FIG. 8 is a schematic diagram showing a light distribution pattern formed by the first, second and third light beams shown in FIGS. 5 to 7.
Figure 9:
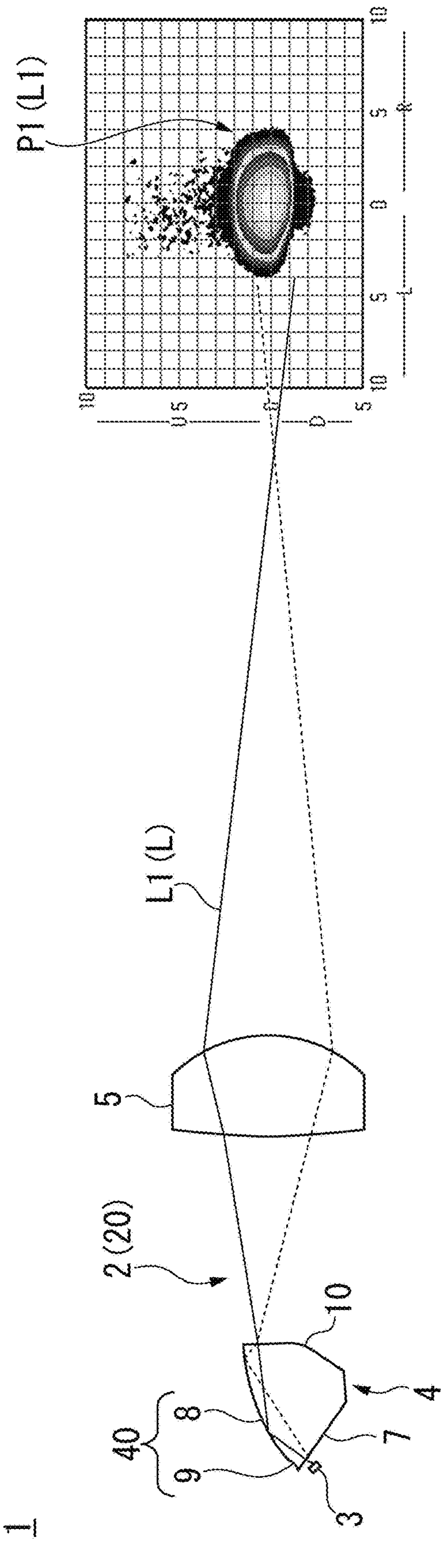
FIG. 9 is a luminous intensity distribution diagram showing a light distribution pattern formed by the first light beam shown in FIG. 6.
Figure 10:
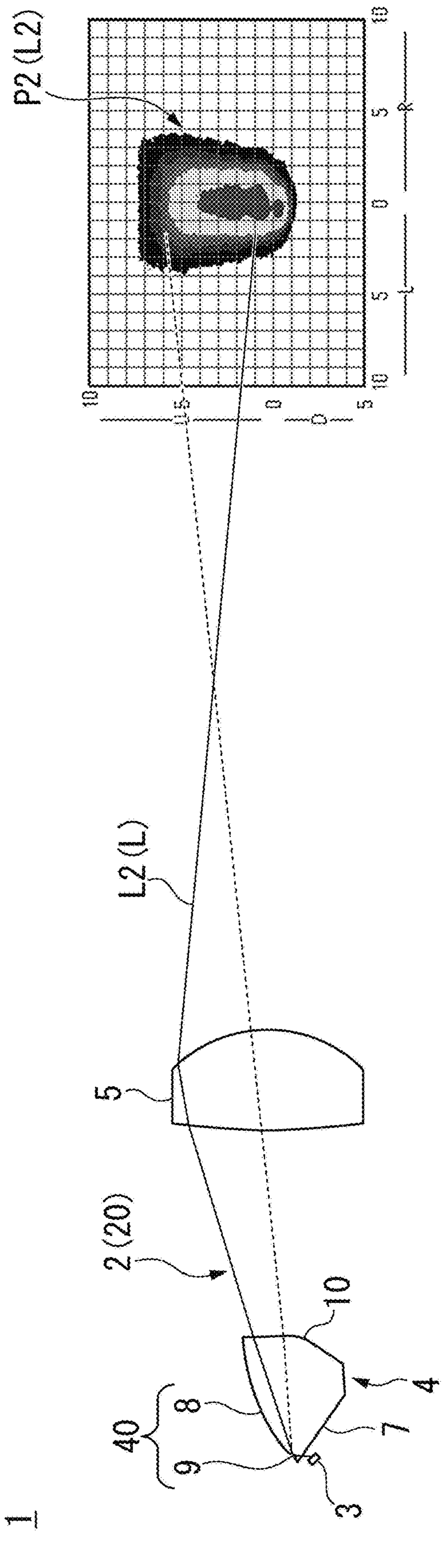
FIG. 10 is a luminous intensity distribution diagram showing a light distribution pattern formed by the second light beam shown in FIG. 7.
Figure 11:
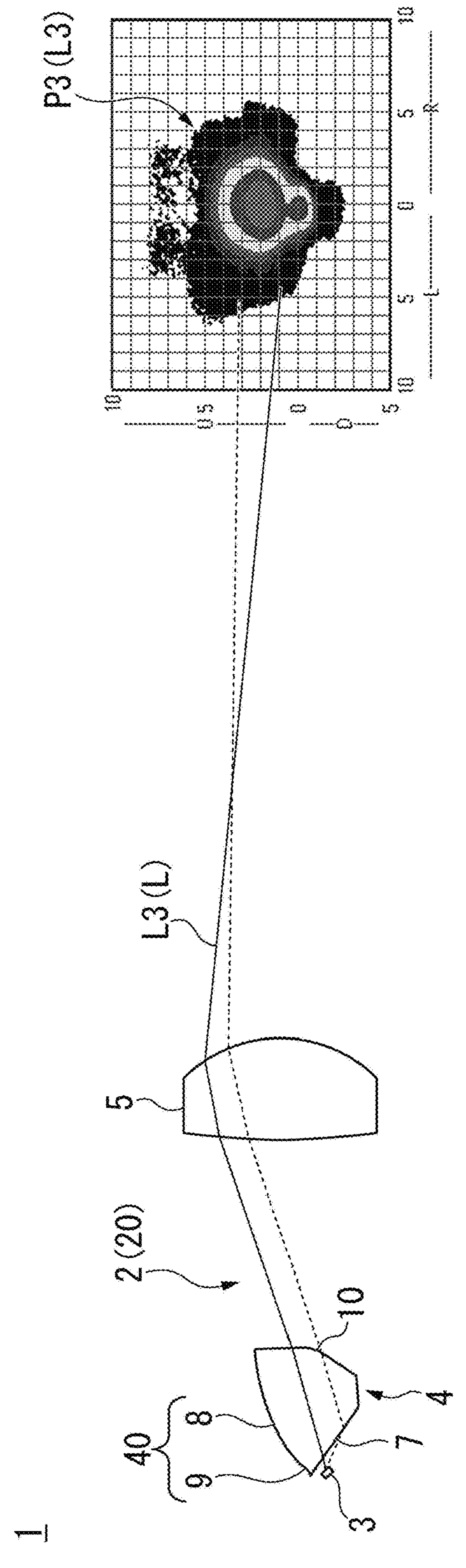
FIG. 11 is a luminous intensity distribution diagram showing a light distribution pattern formed by the third light beam shown in FIG. 8.
Figure 12:
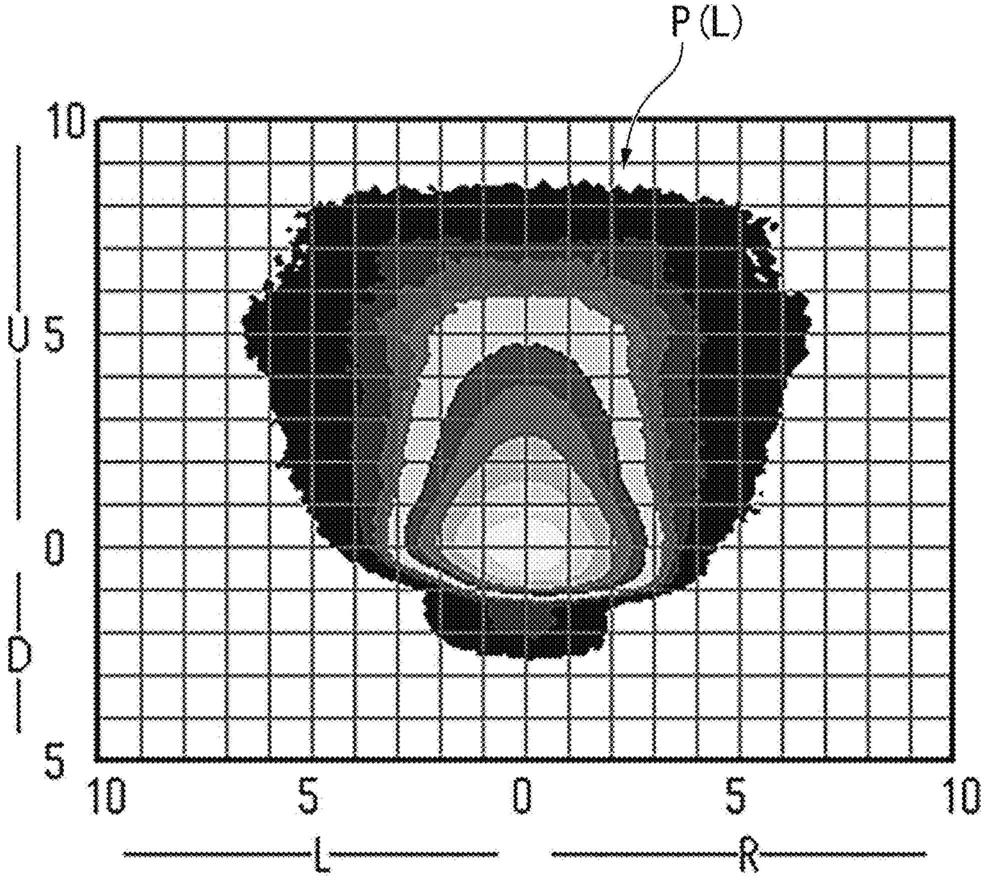
FIG. 12 is a luminous intensity distribution diagram showing a light distribution pattern in which the first, second and third light distribution patterns shown in FIGS. 9 to 11 are superimposed.

FIG. 1 is a side view showing the configuration of the vehicle lamp 1. FIG. 2 is a top view of a light source 3, a light guide lens 4, and a projection lens 5 included in the vehicle lamp 1. FIG. 3 is a front view of the light guide lens 4. FIG. 4 is a rear perspective view of the light guide lens 4. FIG. 5 is a cross-sectional view showing an optical path of a first light beam L1 among light beams L radially emitted from the light source 3 in the light guide lens 4. FIG. 6 is a cross-sectional view showing an optical path of a second light beam L2, among the light beams L radially emitted from the light source 3, in the light guide lens 4. FIG. 7 is a cross-sectional view showing an optical path of a third light beam L3, among the light beams L radially emitted from the light source 3, in the light guide lens 4. FIG. 8 is a schematic diagram showing a light distribution pattern P formed by the first, second and third light beams L1, L2 and L3. FIG. 9 is a luminous intensity distribution diagram showing a first light distribution pattern P1 formed by the first light beam L1. FIG. 10 is a luminous intensity distribution diagram showing a second light distribution pattern P2 formed by the second light beam L2. FIG. 11 is a luminous intensity distribution diagram showing a third light distribution pattern P3 formed by the third light beam L3. FIG. 12 is a luminous intensity distribution diagram showing a light distribution pattern P in which the first, second and third light distribution patterns P1, P2 and P3 are superimposed.

In addition, in the drawings shown below, an XYZ Cartesian coordinate system is set up, with an X-axis direction being a front-rear direction (a lengthwise direction) of the vehicle lamp 1, a Y-axis direction being a left-right direction (a width direction) of the vehicle lamp 1, and a Z-axis direction being an up-down direction (a height direction) of the vehicle lamp 1.

The vehicle lamp 1 of this embodiment is a vehicle headlamp mounted at both corners of a front end of a vehicle (not shown), and serves to emit a dipped beam (a low beam) that forms a low-beam light distribution pattern including a cutoff line at an upper end and a driving beam (a high beam) that forms a high-beam light distribution pattern above the low-beam light distribution pattern, toward the front of the vehicle (in a +X-axis direction).

Here, the vehicle lamp 1 of this embodiment is an application of the present invention to an adaptive light distribution headlamp (ADB) that variably controls a light distribution pattern of light projected toward the front of the vehicle.

Specifically, as shown in FIGS. 1 and 2, the vehicle lamp 1 includes a lamp unit 20 for ADB disposed inside a lamp body (not shown). Further, the lamp unit 20 includes a plurality of lamp cells 2 arranged in the width direction of the vehicle (hereinafter, referred to as a "vehicle width direction"), and has a structure in which the plurality of lamp cells 2 are integrated.

The lamp unit 20 includes a plurality of light sources 3 corresponding to the respective lamp cells 2, and a light guide lens 4 and a projection lens 5 shared among the plurality of lamp cells 2. That is, each of the lamp cells 2 is configured of the light source 3, the light guide lens 4, and the projection lens 5.

The plurality of light sources 3 are, for example, light emitting elements such as light emitting diodes (LEDs) or laser diodes (LDs) that emit white light. The plurality of light sources 3 are located on a front surface of a circuit board 6 on which a drive circuit (not shown) for driving the plurality of light sources 3 is provided, and are arranged in the vehicle width direction.

The circuit board 6 is disposed in a state in which it is inclined diagonally downward toward the front. Thus, each of the light sources 3 radially emits a light beam L with an optical axis AX directed diagonally upward toward the front.

The circuit board 6 is not limited to the configuration in which the above-described drive circuit is provided, and may be configured so that a mounting board on which the plurality of light sources 3 are mounted and a circuit board on which the drive circuit is provided are separately disposed, and the mounting board and the circuit board are electrically connected via a wiring cord (a harness). Thus, it is possible to protect the drive circuit from heat generated by the plurality of light sources 3.

Furthermore, a heat sink for radiating heat generated from the plurality of light sources 3 to the outside and a cooling fan for blowing air toward the heat sink may be provided on a rear surface of the circuit board 6. Thus, it is possible to efficiently radiate heat generated from the plurality of light sources 3 to the outside.

As shown in FIGS. 1 to 4, the light guide lens 4 is made of a light-transmitting material such as a transparent resin, for example, polycarbonate or acrylic, or glass. The light guide lens 4 is disposed between the plurality of light sources 3 and the projection lens 5.

The light guide lens 4 has a lens body **4*a* that extends in the width direction, a plurality of protrusions 4*b* that protrude rearward from a back surface of the lens body 4*a* corresponding to the plurality of light sources 3, and a plurality of grooves 4*c* that separate each of the plurality of protrusions 4*b*. That is, the light guide lens 4 has a structure in which the plurality of protrusions 4*b* are arranged in the width direction and in which adjacent lens bodies 4*a*** are connected in the width direction.

As shown in FIGS. 5 to 7, the light guide lens 4 has an incident surface 7 located on the tip end side (the back surface side) of each of the protrusions **4*b*, a first reflection surface 8 and a second reflection surface 9 located diagonally upward (the upper surface side) in front of the light source 3, and an emission surface 10 located on the side facing the projection lens 5** (the front surface side).

The incident surface 7 is provided on the tip end side of each of the protrusions **4*b* to face the light source 3. The incident surface 7 forms a surface that is inclined diagonally downward toward the front in a cross section in a vertical direction (hereinafter, referred to as a "vertical cross section") including the optical axis AX of the light beam L emitted from the light source 3. On the other hand, the incident surface 7 forms a surface that is approximately perpendicular to the optical axis AX in a cross section in a horizontal direction (hereinafter, referred to as a "horizontal cross section") including the optical axis AX of the light beam L emitted from the light source 3** and in the vertical cross section.

Thus, each of the incident surfaces 7 allows the light beam L emitted from each of the light sources 3 to enter the inside of the protrusion **4*b* (the light guide lens 4**).

Specifically, among the light beam L radially emitted from the light source 3, a light beam (hereinafter, referred to as a "first light beam") L1 in a central region E1 including the optical axis AX shown in FIG. 5 enters the inside of the light guide lens 4 toward the first reflection surface 8. On the other hand, a light beam (hereinafter, referred to as a "second light") L2 in an upper peripheral region E2 above the central region E1 shown in FIG. 6 enters the inside of the light guide lens 4 toward the second reflection surface 9. On the other hand, a light beam (hereinafter, referred to as a "third light beam") L3 in a lower peripheral region E3 below the central region E1 shown in FIG. 7 enters the inside of the light guide lens 4 toward the emission surface 10.

The first reflection surface 8 and the second reflection surface 9 constitute a reflection optical system 40, which reflects the light beam L emitted from the light source 3 towards the projection lens 5, at the upper surface side of the light guide lens 4.

The reflection optical system 40 has a structure in which the second reflection surface 9 and the first reflection surface 8 are arranged in this order toward the front of the light source 3 in the vertical cross section of the light guide lens 4, so that, among the light beam L radially emitted from the light source 3, the first light beam L1 enters the first reflection surface 8, and the second light beam L2 enters the second reflection surface 9. Moreover, the first reflection surface 8 and the second reflection surface 9 form a continuous surface on the upper surface side of the light guiding lens 4.

The first reflection surface 8 forms an outwardly convex curved surface in the vertical cross section of the light guiding lens 4. Thus, the first light beam L1 incident on the first reflection surface 8 is reflected toward the forward emission surface 10 while being condensed.

Moreover, in the vertical cross section of the light guide lens 4, the optical axis AX is preferably located near the center of the first reflection surface 8. Thus, among the light beam L radially emitted from the light source 3, it is possible for a strong light beam (the first light beam L1) in the central region E1 including the optical axis AX to enter the first reflection surface 8.

Furthermore, preferably, a light converging point of the first light beam L1 condensed by the first reflection surface 8 coincides with a focal point S of the projection lens 5. Thus, it is possible to precisely control the first light beam L1 reflected from the first reflection surface 8 toward the projection lens 5.

On the other hand, the second reflection surface 9 forms a surface that is curved in an inward concave shape in the vertical cross section of the light guide lens 4. Thus, the second light beam L2 incident on the second reflection surface 9 is reflected toward the forward emission surface 10 while being diffused.

The emission surface 10 forms a surface that is continuous in the width direction of the lens body 4*a* (the light guide lens 4) on the front surface side of the lens body 4*a* (the light guide lens 4). Moreover, the emission surface 10 forms a surface that is curved in an outward convex shape in the vertical cross section of the light guiding lens 4. On the other hand, the emission surface 10 forms a surface that is curved in an inward concave shape in the horizontal cross section of the light guiding lens 4.

Thus, the emission surface 10 emits the light beam L guided inside the light guide lens 4 to the outside of the lens body 4*a* (the light guide lens 4) toward the projection lens 5.

Specifically, among the light beam L guided inside the light guide lens 4, the first light beam L1 reflected while being condensed by the first reflection surface 8, the second light beam L2 reflected while being diffused by the second reflection surface 9, and the third light beam L3 entered while being diffused from the incident surface 7 are each emitted from the emission surface 10 toward the forward projection lens 5.

A lower surface of the light guide lens 4 forms a surface that connects the incident surface 7 and the emission surface 10.

The projection lens 5 is made of a light-transmitting material such as a transparent resin, for example, polycarbonate or acrylic, or glass. The projection lens 5 is disposed in front of the light guide lens 4. The projection lens 5 extends in the width direction, and is configured by a biconvex lens of which back and front surfaces are curved in an outward convex shape in the vertical cross section.

Thus, the projection lens 5 projects the light beam L emitted from the emission surface 10 of the light guide lens 4 toward the front of the vehicle while enlarging the light beam L.

In the vehicle lamp 1 of this embodiment having the above-described configuration, as shown in FIG. 8, by superimposing (combining) a first light distribution pattern P1 formed by the first light beam L1, a second light distribution pattern P2 formed by the second light beam L2, and a third light distribution pattern P3 formed by the third light beam L3, as a whole, one light distribution pattern P is formed, and this light distribution pattern P is projected toward the front of the vehicle while being inverted upside down by the projection lens 5.

In addition, in the vehicle lamp 1 of this embodiment, in the ADB lamp unit 20, it is possible to variably control the light distribution pattern P of the light beam L projected toward the front of the vehicle while switching lighting of the plurality of light sources 3.

FIG. 9 shows the first light distribution pattern P1 obtained by simulation when the first light beam L1 is projected forward of the projection lens 5 onto a virtual vertical screen directly facing the projection lens 5. On the other hand, FIG. 10 shows the second light distribution pattern P2 when the second light beam L2 is projected forward of the projection lens 5 onto the virtual vertical screen directly facing the projection lens 5. On the other hand, FIG. 11 shows the third light distribution pattern P3 when the third light beam L3 is projected forward of the projection lens 5 onto the virtual vertical screen directly facing the projection lens 5. Furthermore, FIG. 12 shows the light distribution pattern P when the light beam L (the first, second and third light beams L1, L2, and L3) radiated forward of the projection lens 5 is projected onto the virtual vertical screen directly facing the projection lens 5. In FIGS. 9 to 11, solid lines indicate light rays of the respective light beams L1, L2, and L3 that are close to the optical axis AX, and dashed lines indicate light rays of the respective light beams L1, L2, and L3 that are far from the optical axis AX.

In the vehicle lamp 1 of this embodiment, the above-described first light beam L1 enters from the incident surface 7 toward the first reflection surface 8, and then is reflected toward the forward emission surface 10 while being condensed by the first reflection surface 8.

At this time, as shown in FIG. 9, in the vertical cross section of the light guide lens 4, the optical axis AX of the first light beam L1 is located near the center of the first reflection surface 8, and after the first light beam L1 has entered the first reflection surface 8, the first light beam L1 is reflected while being condensed toward the emission surface 10 so that the light ray closer to the optical axis AX passes through the side closer to the focal point S of the projection lens 5.

Thus, the first light beam L1 emitted from the emission surface 10 forms the first light distribution pattern P1 having a high luminous intensity on the side of a horizontal line H on the virtual vertical screen, as shown in FIG. 8.

On the other hand, in the vehicle lamp 1 of this embodiment, the above-described second light beam L2 enters from the incident surface 7 toward the second reflection surface 9, and then is reflected toward the forward emission surface 10 while being diffused by the second reflection surface 9.

At this time, as shown in FIG. 10, in the vertical cross section of the light guide lens 4, the second light beam L2 enters the second reflection surface 9, and is then reflected while being diffused toward the emission surface 10 so that the light ray closer to the optical axis AX passes through the side closer to the focal point S of the projection lens 5.

Thus, the second light beam L2 emitted from the emission surface 10 forms the second light distribution pattern P2 having a spread in a direction of a vertical line V on the virtual vertical screen, as shown in FIG. 8.

On the other hand, in the vehicle lamp 1 of this embodiment, the above-described third light beam L3 enters from the incident surface 7 toward the emission surface 10 while being refracted.

At this time, as shown in FIG. 11, the third light beam L3 enters the incident surface 7 in the vertical cross section of the light guide lens 4, and then refracted toward the emission surface 10 so that the light ray closer to the optical axis AX passes through the side closer to the focal point S of the projection lens 5.

Thus, the third light beam L3 emitted from the emission surface 10 forms the third light distribution pattern P3 that complements for the first light distribution pattern P1 and the second light distribution pattern P2, as shown in FIG. 8.

In addition, the first, second and third light distribution patterns P1, P2, and P3 have larger irradiation ranges in the direction of the vertical line V (the up-down direction) in the order of the second light distribution pattern P2, the third light distribution pattern P3, and the first light distribution pattern P1. On the other hand, a maximum value of the luminous intensity increases in the order of the first light distribution pattern P1, the second light distribution pattern P2, and the third light distribution pattern P3. Lower ends of the first, second, and third light distribution patterns P1, P2, and P3 are located on approximately the same horizontal line.

Therefore, as shown in FIG. 8 and FIG. 12, by superimposing the first, second and third lights L1, L2 and L3 described above, the light beam L emitted from the emission surface 10 of the light guide lens 4 forms the light distribution pattern P having a high luminous intensity on the side of the horizontal line H on the virtual vertical screen and a wide spread in the direction of the vertical line V.

As described above, in the vehicle lamp 1 of this embodiment, it is possible to improve the efficiency of use of the light beam L and obtain a good light distribution pattern P. That is, in the vehicle lamp 1, the luminous intensity near the cutoff line of the low-beam light distribution pattern is improved, the maximum luminous intensity of the high-beam light distribution pattern is not insufficient, and the spread of the light beam L projected by the projection lens 5 in the up-down direction can be increased.

The present invention is not necessarily limited to the above-described embodiment, and various modifications can be made without departing from the scope of the present invention.

For example, the reflection optical system 40 is not limited to being constituted by a part of the light guide lens 4 described above, but may also be constituted by a reflector including the first reflection surface 8 and the second reflection surface 9.

Furthermore, the present invention can be suitably used for a vehicle lamp in which a light beam emitted from the above-described light source diagonally upward toward the front is reflected by a reflection surface toward the projection lens located in the front side.

What is claimed is:

1. A vehicle lamp comprising:

a light source configured to radially emit a light beam diagonally upward toward a front;

a projection lens that is disposed in front of the light source and that is configured to project light beam emitted from the light source toward a front of a vehicle; and a reflection optical system that is disposed between the light source and the projection lens and that is configured to reflect the light beam emitted from the light source toward the projection lens, wherein the reflection optical system has a first reflection surface and a second reflection surface that are located diagonally above and in front of the light source, in a vertical cross section including an optical axis of the light beam emitted from the light source, the second reflection surface and the first reflection surface are arranged in this order toward the front of the light source, so that, among light beam emitted radially from the light source, a light beam in a central region including the optical axis enters the first reflection surface, and a light beam in an upper peripheral region above the central region enters the second reflection surface, the first reflection surface forms a surface that is curved in an outward convex shape in the vertical cross section to reflect the light beam in the central region toward the projection lens while condensing the light beam, and the second reflection surface forms a surface that is curved in an inward concave shape in the vertical cross section to reflect the light beam in the upper peripheral region toward the projection lens while diffusing the light beam.

2. The vehicle lamp according to claim 1, wherein a light distribution pattern obtained by superimposing a first light distribution pattern formed by the light beam in the central region and a second light distribution pattern formed by the light beam in the upper peripheral region is projected forward while being inverted upside down by the projection lens.

3. The vehicle lamp according to claim 2, wherein the second light distribution pattern has a larger irradiation range in an up-down direction than the first light distribution pattern, and the first light distribution pattern has a higher maximum luminous intensity than the second light distribution pattern.

4. The vehicle lamp according to claim 1, wherein the first reflection surface and the second reflection surface form a continuous surface.

5. The vehicle lamp according to claim 1, wherein the reflection optical system is constituted by a part of a light guide lens, the light guide lens has an incident surface that is located on a side facing the light source, the first reflection surface and the second reflection surface that are located diagonally upward in front of the light source, and an emission surface that is located on a side facing the projection lens, the light incident surface allows the light beam emitted from the light source to enter an inside of the light guiding lens, and the light emission surface emits the light beam guided inside the light guide lens to an outside of the light guide lens toward the projection lens.

6. The vehicle lamp according to claim 5, wherein the incident surface forms a surface that is inclined diagonally downward toward the front in the vertical cross section, and among the light beam radially emitted from the light source, the incident surface enters a light beam in a lower peripheral region below the central region into the inside of the light guide lens toward the emission surface.

7. The vehicle lamp according to claim 6, wherein a light distribution pattern in which a first light distribution pattern formed by the light beam in the central region, a second light distribution pattern formed by the light beam in the upper peripheral region, and a third light distribution pattern formed by the light beam in the lower peripheral region are superimposed is projected forward while being inverted upside down by the projection lens.

8. The vehicle lamp according to claim 7, wherein an irradiation range in an up-down direction is larger in order of the second light distribution pattern, the third light distribution pattern, and the first light distribution pattern, and a maximum luminous intensity is larger in order of the first light distribution pattern, the second light distribution pattern, and the third light distribution pattern.

9. The vehicle lamp according to claim 5, wherein a plurality of light sources are arranged in a width direction of the vehicle, the light guide lens has the incident surface, the first reflection surface, the second reflection surface, and the emission surface which are disposed corresponding to each of the light sources, the emission surface is provided continuously in a width direction of the light guide lens, and the light distribution pattern of the light beam projected by the projection lens is variably controlled while lighting of the plurality of light sources are switched.

10. The vehicle lamp according to claim 1, wherein a plurality of light sources are arranged in a width direction of the vehicle, the reflection optical system is disposed corresponding to each of the light sources, and the light distribution pattern of the light beam projected by the projection lens is variably controlled while lighting of the plurality of light sources are switched.

* * * * *